United States Patent [19]
Bacon

[11] 3,821,964
[45] July 2, 1974

[54] VALVED TANK NOZZLE FOR A STORAGE TANK

[76] Inventor: Vincent S. Bacon, 3835 Fairway Dr., Canfield, Ohio 44406

[22] Filed: Feb. 23, 1973

[21] Appl. No.: 335,091

[52] U.S. Cl............... 137/317, 137/454.2, 251/144
[51] Int. Cl....................... B23b 41/08, F16e 41/04
[58] Field of Search............ 137/15, 315, 317, 318, 137/322, 454.2, 454.4, 454.5, 454.6, 527; 251/144, 145, 318; 29/157.1 R

[56] References Cited
UNITED STATES PATENTS

| | | | |
|---|---|---|---|
| 1,787,947 | 1/1931 | Lehnert | 137/454.2 X |
| 1,926,759 | 9/1933 | Wallman | 137/454.2 |
| 2,553,991 | 5/1951 | Wagner et al. | 251/144 X |
| 2,727,528 | 12/1955 | DuPuy | 137/454.2 |
| 2,765,806 | 10/1956 | Webster | 137/322 |
| 3,272,033 | 9/1966 | Leopold, Jr. et al. | 137/318 X |
| 3,275,023 | 9/1966 | Raspante | 137/454.2 X |
| 3,335,742 | 8/1967 | Novak | 137/318 |
| 3,498,322 | 3/1970 | Gilliam | 137/454.2 X |

Primary Examiner—William R. Cline
Assistant Examiner—David R. Matthews
Attorney, Agent, or Firm—Webster B. Harpman

[57] ABSTRACT

A valved tank nozzle for installation on a filled storage tank includes a first tubular member arranged to be welded to the tank, a second tubular member detachably mounted thereon, said first tubular member arranged to provide a communicating support for said second tubular member and a gate valve, a third tubular member insertable through said gate valve and second tubular member into said first tubular member and a spring urged normally closed poppet valve on said tubular member, a lever extending exteriorly of said second tubular member engages a rod therein for moving said poppet valve to open position. An opening is formed in the filled storage tank in communication with the tank nozzle after the first tubular member is installed thereon.

4 Claims, 3 Drawing Figures

3,821,964

VALVED TANK NOZZLE FOR A STORAGE TANK

BACKGROUND OF THE INVENTION

1. Field of the Invention

This invention relates to a device providing a valved controlled communicating passageway with a filled storage tank such as an oil storage tank or the like.

2. Description of the Prior Art

The known prior art relates to the attachment of taps on pipes. See for example U.S. Pat. Nos. 936,618, 1,701,691, 2,756,486, 3,335,742 and Re. Re18,353.

This invention relates to a device used in tapping a filled storage tank to establish a communicating passageway incorporating a check valve which will prevent accidental flow of the contents out of the tank through the passageway.

SUMMARY OF THE INVENTION

A valved tank nozzle for a filled storage tank is arranged to establish a communicating passageway therewith and has a spring urged poppet valve in said passageway to prevent accidental flow from the tank, said nozzle includes a first tubular member for attachment to the tank wall through which a hole may be cut in said tank wall, a second tubular member for attachment to said first tubular member is arranged to support a gate valve and a third tubular member is arranged to be positioned through said gate valve and the second tubular member into said first tubular member, said spring urged poppet valve being positioned on said third tubular member. A rod is engaged on said poppet valve and a lever in said second tubular member engaged on said rod, said lever is provided with an extension exteriorly of said second tubular member so that said poppet valve may be moved thereby.

DESCRIPTION OF THE PREFERRED EMBODIMENT

Figure 1:
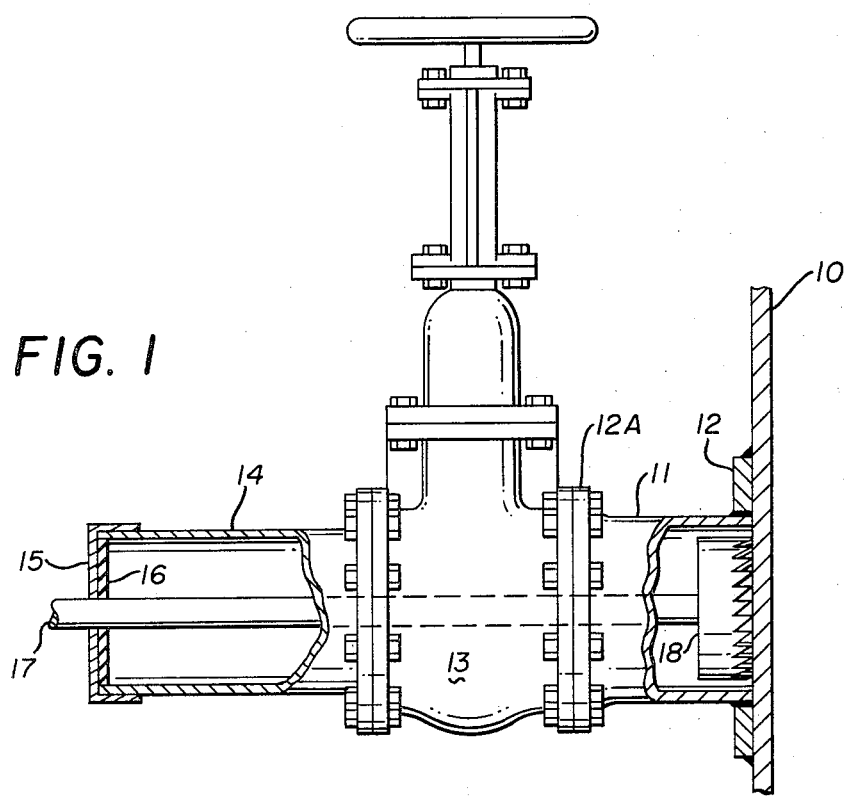
FIG. 1 is a side elevation with parts broken away and parts in cross section illustrating the essential portions of a device for cutting a hole in a storage tank.

The valved tank nozzle disclosed herein and the manner of using the same may be best described in connection with FIGS. 1 and 2 of the drawings. In FIG. 1 of the drawings a wall 10 of a storage tank, such a petroleum storage tank may be seen, and it will occur to those skilled in the art that in order to provide a communicating passageway with the interior of the tank, the right side of the wall 10 as seen in FIG. 1 it is necessary to cut an opening in that wall. According to the method herein disclosed a tank nozzle 11, having a flange 12 thereon is welded to the tank wall 10 so as to enclose the area in which the communicating passageway is to be formed. A spaced second flange 12A on the tank nozzle 11 is provided with apertures to which a gate valve 13 is bolted, the gate valve is open. The opposite side of the gate valve 13 receives a chamber 14 which is bolted thereto as will be understood by those skilled in the art and the chamber 14 has a cap 15 including a gland 16 through which a shaft 17 extends for movement relative thereto. A cutting tool 18 movable within the chamber 14 is attached to the end of the shaft 17 and is moved out of the chamber 14 through the gate valve 13 and the nozzle 11 and into cutting position against the tank wall 10 where it is rotated by means not shown so as to cut a circular opening in the tank wall 10. It will be seen that when this opening is cut, the cut portion will be partially engaged by the cutting tool 18 and may be removed thereby through the gate valve 13 and into the chamber 14.

Fluid in the tank 10 cannot escape as it is confined within the tank nozzle 11, the gate valve 13 and the chamber 14 which is closed with exception of the gland 16 through which the shaft 17 moves. When the cutting tool 18 and the cut section of the tank wall 10 are in the chamber 14, the gate valve 13 is closed and the chamber 14 and cutting tool removed therefrom. A mounting device carrying an annular check valve is substituted for the cutting tool on the shaft 17 and positioned within the chamber 14 and the chamber 14 reattached to the gate valve 13.

Figure 2:
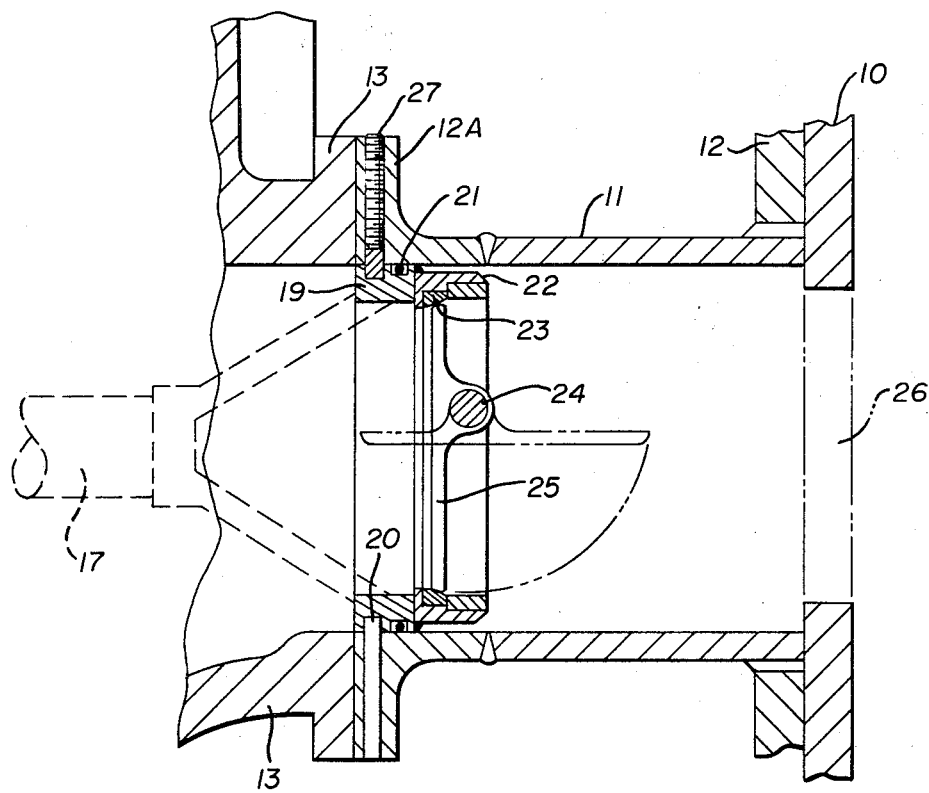
FIG. 2 is a cross sectional elevation of a portion of the device seen in FIG. 1 and illustrating a check valve positioned therein.

The gate valve 13 is again opened, the shaft 17 carrying the check valve is inserted therethrough and by referring to FIG. 2 of the drawings, the check valve may be seen to comprise an annular ring 19 having a peripheral groove 20 therein and an annular seal 21 thereabout. An annular extension 22 of the ring 19 forms a valve seat 23 and provides a transverse pivot 24 to which a self-closing annular check valve 25 is movably attached.

Still referring to FIG. 2 of the drawings it will be seen that the opening in the tank wall 10 is indicated by the numeral 26 and that the same communicates with the interior of the tank nozzle 11. When the annular ring 19 and the check valve extension 22 are in appropriate position as seen in FIG. 2 of the drawings and relative to the tank nozzle 11, a plurality of radially positioned set screws 27 are turned inwardly of threaded openings in the second flange 12A of the tank nozzle 11 so as to engage the annular groove 20 in the annular ring 19 and thus secure the check valve and its mounting means in position in the tank nozzle 11. The member carrying the check valve on the end of the shaft 17 is then disengaged and removed through the gate valve 13 and into the chamber 14. The check valve 25 will move to closed position so that if desired the gate valve 13 and the chamber 14 may be removed or alternately the gate valve 13 may be left in position and flanged pipe secured thereto to provide a desired connection with the tank and the opening newly formed therein.

It will thus be seen that the method disclosed herein permits the simple and effective tapping of a storage tank and positioning a check valve in the opening formed so as to control the flow of fluid from the tank. In petroleum storage tanks suitable piping connected either to the tank nozzle or the gate valve 13 may then be used to pump oil into the tank as desired and in the event of a rupture in the piping the check valve will automatically prevent the contents of the tank from flowing outwardly through the check valve controlled opening.

Figure 3:
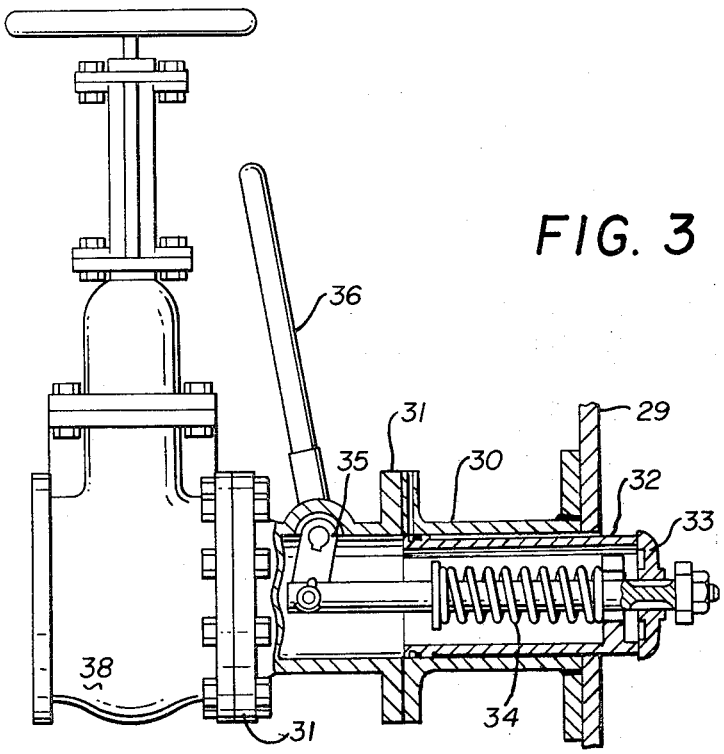
FIG. 3 is a modification of the arrangement seen in FIG. 2 of the drawings and substituting a spring urged poppet valve for the fluid actuated check valve of FIG. 2.

It will occur to those skilled in the art that it is possible to utilize practically the same method for installing a spring actuated poppet valve in a petroleum storage tank and by referring to FIG. 3 of the drawings, such a device may be seen installed in a tank nozzle, which is welded to the tank wall.

In FIG. 3 the tank wall is indicated by the numeral 29, a first tubular member forms a tank nozzle 30 and is attached to the tank wall 29 and a poppet valve 33 is positioned in and sealed and secured to the tank nozzle 30. A second tubular member 31 having flanges at its opposite ends is attached to said first tubular member 30 and a third tubular member 32 is positioned in the tank nozzle 30. The outer end of the third tubular member 32 is controlled by the poppet valve 33 as will be understood by those skilled in the art. A spring 34 normally biases the poppet valve element 33 to closed position and a rod extending therefrom is attached to a pivoted lever 35 which has a handle 36 thereon exteriorly of the second tubular member so that the movement of the handle 36 will cause the poppet valve element 33 to open. The handle may be secured in valve open position by a restraining means incorporating a fusible element. A gate valve 38 is bolted to one of the flanges of the tubular member 31 and the other of the flanges thereon may be bolted to the matching flange on the tank nozzle 30.

Still referring thereto it will be seen that the third tubular member 32 has an enlarged shoulder on the inner end thereof opposite to that normally closed by the poppet valve 33 and that the shoulder has a peripheral groove thereabout together with an annular seal in the same manner as the ring 19 heretofore described in connection with FIG. 2 of the drawings. The third tubular member 32 is secured to the tank nozzle 30 in the same manner as the ring 19 and the check valve of FIG. 2 are secured to the tank nozzle 11. The means of securing is preferably a key engagable in the peripheral groove and backed up by set screws positioned in radial openings in the matching flange of the tank nozzle 30 just as was the case in the embodiment of the invention heretofore described in connection with FIG. 2 of the drawings.

The installation of the poppet valve modification of FIG. 3 of the drawings is similar to that heretofore described in connection with the installation of the check valve 25 as seen in FIG. 2 of the drawings.

By again referring to FIG. 3 of the drawings it will be seen that the first tubular member forming the tank nozzle 30 may be attached to the wall 29 of the storage tank as by welding the same thereto. The third tubular member 31 member having the flanges on its opposite ends is then bolted to the doubly flanged tank nozzle 30 with the poppet valve, the acutating rod, spring and handle removed therefrom. The gate valve 38 is then attached to the second tubular member and a chamber like that at 14 in FIG. 1 is attached to the gate valve 38. A cutter 18 on a shaft 17 such as seen in FIG. 1 having been previously positioned in the chamber 14 is then moved through the gate valve 38 and into engagement with the tank wall 29 and actuated to cut an opening therein. The cut section and the cutting tool 18 are then removed through the gate valve 38 which is then closed. The chamber 14 is opened, the cutting tool removed and the third tubular member 32 substituted therefore on the end of the shaft 17, the chamber 14 is reinstalled, the gate valve 38 opened and the third tubular member 32 positioned in the tank nozzle 30 and partially within the storage tank as seen in FIG. 3 of the drawings. Keys and set screws are installed to secure the third tubular member in position and the valve element 33 being closed seals the opening in the tank wall. The lever 35 and the handle 36 may then be installed and subsequently exterior piping may be attached to the gate valve 38 to provide a desired connection with the storage tank and the opening newly formed therein which is subject to the control of the manually movable poppet valve.

It will thus be seen that the valved tank nozzle disclosed herein permits the simple and effective tapping of a storage tank and positioning of a spring actuated poppet valve in a manner so that the newly formed opening is suitably and automatically controlled.

Those skilled in the art will observe that the invention permits existing storage tanks to be provided with check valve controlled access openings which are completely fire safe as in the event of rupture of the piping connected therewith, the check valves will automatically close and prevent the contents of the tank from discharging.

Having thus described my invention what I claim is:

1. A valved tank nozzle for attachment to a filled storage tank and consisting of a first tubular member adapted to be welded to said tank, said tank having an opening communicating with said first tubular member, a second tubular member attached to said first tubular member to establish a communicating passageway therewith, a third tubular member insertable in said first tubular member in sealing relation therewith, a valve on said third tubular member controlling said communicating passageway, means biasing said valve to closed position and means axially of said third tubular member for moving said valve to open position and means in said second tubular member and extending exteriorly thereof for imparting movement to said means for moving said valve.

2. The apparatus of claim 1 wherein said third tubular member is cylindrical and said means for biasing said valve consists of a transverse member positioned across said third tubular member, a rod engaged on said valve and extending through an aperture in said transverse member, a collar on said rod and a coil spring around said rod and between said collar and said transverse member so as to bias said valve to closed engagement on said tubular member.

3. The apparatus of claim 1 wherein said third tubular member is cylindrical and said valve comprises an element movable toward and away from one end of said third tubular member, means positioning said element for movement with respect to said third tubular member, said means consisting of a rod engaged on said element and located axially of said second tubular member and said third tubular member, means in said second tubular member and in said third tubular member movably supporting said rod, said means in said second tubular member movably supporting said rod comprising a lever pivotally attached to said second tubular member and said rod, a handle exteriorly of said second tubular member engaging said pivotal attachment and arranged for imparting movement to said lever and said rod.

4. The apparatus of claim 1 and wherein said third tubular member is of a greater length than said first tubular member so as to extend into said storage tank through said opening and wherein said valve consists of a check valve located on the end of said third tubular member and within said tank.

* * * * *